United States Patent Office 2,717,909
Patented Sept. 13, 1955

2,717,909

HYDROXYETHYL-KERYL-ALKYLENE-AMMONIUM COMPOUNDS

Milton Kosmin, Dayton, Ohio, assignor to Monsanto Chemical Company, St. Louis, Mo., a corporation of Delaware No Drawing. Application September 24, 1953,
Serial No. 382,208

4 Claims. (Cl. 260—567.6)

The present invention provides a new class of quaternary ammonium compounds which is characterized by possessing high wetting-out ability.

The new compounds are addition products of N-kerylalkylenepolyamines, ethylene oxide and water. The presently useful N-kerylalkylenepolyamines are disclosed in the Matthews copending application Serial No. 225,909, filed May 11, 1951, and assigned to the same assignee as is the present application. They have the general formula $$\text{keryl—NH—R—(NH—R)}_n\text{—NH}_2$$

in which keryl denotes the mixture of alkyl radicals corresponding to the hydrocarbons of kerosene, R is an alkylene radical of from 2 to 3 carbon atoms, and n is an integer of 0 to 2.

Such N-kerylalkylenepolyamines are prepared by condensing an appropriate alkylene polyamine with kerosene chloride as the alkylating agent. The kerosene chloride reactants used in the preparation of the kerylated polyamines are obtained by substantial mono-chlorination of a kerosene distilling between approximately 150° C. and 300° C. Kerosene distillates containing approximately 60–80% paraffins, 0–5% olefins, 8–16% aromatics, and 10–25% naphthenes, upon chlorination produce a mono-chlorinated kerosene reactant which is particularly desirable. Such distillates may be obtained from Pennsylvania base oil and are often termed paraffin base kerosenes. In general, however, a kerosene chloride obtained from a kerosene fraction distilling between approximately 150° C. and 300° C. and consisting substantially of paraffinic hydrocarbons is preferred. Of this particular embodiment of the present invention the kerosene fraction distilling between approximately 190° C. and 250° C. is preferred. Substantial mono-chlorination of kerosene or a fraction thereof may be obtained by introducing chlorine into the kerosene until the kerosene is substantially one-third to two-thirds chlorinated on a molar basis. Alkylenepolyamines from which the N-kerylalkylenepolyamines are prepared are those containing at least 2 but less than 5 nitrogen atoms in the molecule, each alkylene radical of which has from 2 to 3 carbon atoms. They may be obtained by the reaction of ammonia with dihalogenated ethane or propane having the halogens on different carbon atoms, that is, not more than one halogen on any single carbon atom. Such alkylenepolyamines include ethylenediamine and propylenediamine, diethylenetriamine, triethylenetetramine, dipropylenetriamine and the like. Such polyamines may also be obtained by other known methods of synthesis.

As examples of N-kerylalkylenepolyamines which may be reacted with ethylene oxide to give the present adducts may be mentioned the following:

N-keryltripropylenetetramine
N-keryltriethylenetetramine
N-keryldipropylenetriamine
N-keryldiethylenetriamine
N-kerylpropylenediamine
N-kerylethylenediamine The addition of ethylene oxide to N-alkylalkylenepolyamines to give polyglycols is known in the art, see, e. g., the Schoeller et al. U. S. Patent No. 2,214,352 and German Patent No. 667,744, wherein there are prepared polyether derivatives of dodecyl- or octadecylethylenediamine or of dodecylpropylenediamine. The reaction of an N-kerylalkylenepolyamine with as many moles of ethylene oxide as there are amino-hydrogen atoms leads to the formation of tertiary amines, thus

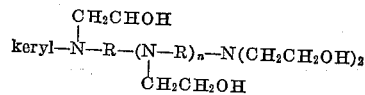

In the absence of water, additional quantities of ethylene oxide convert the hydroxyethyl substituents of the above formula into hydroxyethoxyethyl or polyglycol substituents, depending upon the quantity of ethylene oxide. Irrespective of the quantity of ethylene oxide used, when no water is present, the reaction product of an N-alkylalkylene polyamine and ethylene oxide is a tertiary amine.

Now I have discovered that quaternary ammonium compounds possessing outstanding bactericidal and wetting-out properties are obtained when a tertiary amine of the type illustrated by the above formula is further reacted with a mixture of ethylene oxide and water, in which mixture there is present at least a molar quantity of water with respect to the ethylene oxide.

For example, if the tertiary polyamine illustrated in the formula above is reacted with one mole of ethylene oxide and one mole of water, one of the tertiary amino groups will be converted to a quaternary ammonium hydroxide group. If the tertiary polyamine is reacted with as many moles of ethylene oxide and water as there are tertiary amino groups, all of the tertiary amino groups will be converted to quaternary ammonium hydroxide groups. If the tertiary polyamine is reacted with more moles of ethylene oxide than there are tertiary amino groups and at least as many moles of water as there are said amino groups, there will be formed quaternary ammonium hydroxide compounds having at least one polyglycol substituent.

Since I do not know the order in which the tertiary amino groups react as described above, it is impossible to write a formula for various quaternary ammonium compounds obtainable by the present process. Accordingly, I prefer to describe the present products as quaternary ammonium compounds comprising the adducts of from 1 to 20 moles of ethylene oxide and from one to four moles of water with one mole of an N-keryl tertiary amine having the above formula.

With an N-alkylalkylenepolyamine such as N-keryldiethylenetriamine, ethylene oxide may be caused to react to give the following compounds:

I. With 4 moles of ethylene oxide, in the presence or absence of water,

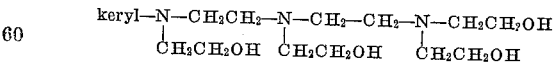

Compounds of this type are disclosed in my copending application Serial No. 243,746, filed June 11, 1953.

II. With 7 moles of ethylene oxide, and water present at least after the first 4 moles of ethylene oxide have been introduced,

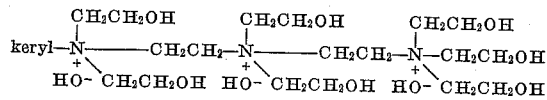

III. With more than 7 moles of ethylene oxide and water present at least after the first 4 moles of ethylene oxide have been introduced,

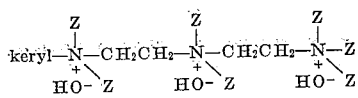

wherein Z is —$CH_2(CH_3OCH_2)_nCH_2OH$ in which $n$ is an integer of from 0 to 2 and in which there is present at least one Z having $n$ greater than 0.

Compounds II and III above are quaternary ammonium compounds of the type provided by the present invention.

Preparation of the present quaternary compounds is carried out by contacting the tertiary amine with either gaseous or liquid ethylene oxide in the presence of water, at ordinary or increased temperature until formation of the desired addition product has occurred. Generally it is preferred to control the reaction rate by gradual introduction of the ethylene oxide into the polyamine and by employing external cooling in order to maintain only moderately increased temperatures in the reaction zone. Thorough mixing of the reactants also serves to effect smooth reaction; when working with gaseous ethylene oxide such mixing may be conveniently obtained by introducing the ethylene oxide to the reaction zone through a dispersion tube.

The invention is further illustrated, but not limited, by the following examples:

Example 1

This example shows the addition of ethylene oxide to an N-keryldiethylenetriamine which had been obtained by condensing with diethylenetriamine a substantially monochlorinated kerosene fraction (57.4% chlorinated on a molar basis, and prepared from an unchlorinated kerosene fraction boiling at about 150° C.–250° C.). A mixture of 135.0 g. (0.5 mole, based on the keryl radical as $C_{12}$) of the N-keryldiethylenetriamine and 270.0 g. of water was heated to 65° C. in a nitrogen atmosphere and into the mixture there were then passed 86 g. of ethylene oxide. During this time the temperature of the reaction mixture was maintained at 65° C. to 90° C. The product thus obtained was an aqueous solution of N-keryl-N',N',N''-tetrakis(2-hydroxyethyl)diethylenetriamine.

To 128 g. of this solution there was added 133 g. of water and 25 g. of ethylene oxide was passed into the resulting solution during a period of one hour and at a temperature of 65° C.–75° C. The resulting aqueous solution was dried by distilling off the water, intermittent additions of ethanol being made to the distilling vessel towards the end of the distillation in order to drive off the last traces of water, and by finally maintaining the residue at a pot temperature of 40° C./19 mm. for 1.5 hours. There was thus obtained 87.1 g. (theoretical yield—82.6 g.) of the substantially pure adduct of one mole of the N-keryldiethylenetriamine with 7 moles of ethylene oxide and 3 moles of water. Determination of its basicity showed it to be a quaternary ammonium compound corresponding to the formula

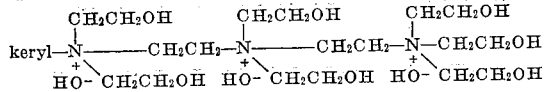

This quaternary ammonium compound was tested for wetting-out property as shown in Example 3.

Example 2

For purposes of comparison, the following preparation was made:

To 183.0 g. (0.675 mole) of N-$n$-dodecyldiethylenetriamine there was gradually added 179 g. of water. A stream of ethylene oxide was then passed into the resulting mixture, and the stream continued for 5 hours, at the end of which time 119 g. of ethylene oxide had combined with the polyamine. Towards the end of the 5-hour period, a gas dispersing tube was used for introducing the ethylene oxide. The mass became hot due to the exothermic reaction heat and external cooling was employed in order to maintain the temperature of the reaction mixture at around 70° C. The product thus obtained was an aqueous solution of N-$n$-dodecyl-N,N',N',N''-tetrakis-(2-hydroxyethyl)diethylenetriamine.

To 228 g. of this solution there was added 100 g. of water and 43 g. of ethylene oxide was passed into the resulting mixture by means of a dispersing tube during a period of about 1 hour and at a temperature of about 75° C.–80° C. The aqueous product thus obtained was dried by distilling off the water, intermittent additions of ethanol being made to the distilling vessel towards the end of the distillation in order to drive off the last traces of water, and by finally maintaining the residue at a pot temperature of 40° C./19 mm. for 1.5 hours. There was thus obtained a quaternary ammonium compound corresponding to the formula

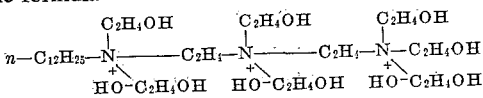

Example 3

The speed of wetting as measured by the Draves test of the quaternary ammonium compounds of Examples 1 and 2 when dissolved in water to form aqueous solutions of the concentrations shown below gave the following values:

| Product Tested | Speed of wetting in seconds at percent concentration | | | | |
| --- | --- | --- | --- | --- | --- |
|  | 0.5 | 0.25 | 0.125 | 0.0625 | 0.031 |
| Example 1 | 4.8 | 12.3 | 40.6 | 100 | 180+ |
| Example 2 | 28.7 | 45.0 | 86.5 | 180+ | |

This application is a continuation-in-part of my application Serial No. 243,746, filed August 25, 1951, now U. S. Patent 2,695,314.

What I claim is:

1. A quaternary ammonium compound having the formula

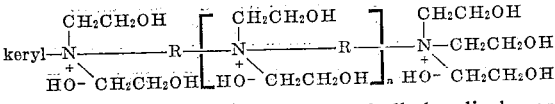

in which keryl denotes the mixture of alkyl radicals corresponding to the hydrocarbons of kerosene, R is an alkylene radical of from 2 to 3 carbon atoms, and $n$ is an integer of from 0 to 2.

2. A quaternary ammonium compound having the formula

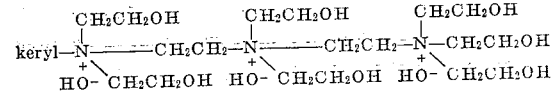

in which keryl denotes the mixture of alkyl radicals corresponding to the hydrocarbons of kerosene.

3. The method which comprises passing from one to 20 moles of ethylene oxide into a mixture of water and a mole of a tertiary polyamine having the formula

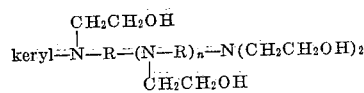

in which keryl denotes the mixture of alkyl radicals corresponding to the hydrocarbons of kerosene, R is an alkylene radical of from 2 to 3 carbon atoms and $n$ is an integer of from 0 to 2, the quantity of water in said mixture being at least the molar equivalent of said tertiary polyamine, and recovering from the resulting reaction mixture a quaternary ammonium compound in which from 1 to 20 moles of ethylene oxide and from 1 to 4 moles of water have combined with said tertiary amine.

4. The method which comprises passing 3 moles of ethylene oxide into a mixture of water and a mole of a tertiary polyamine having the formula

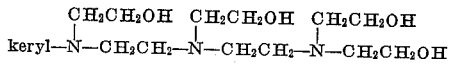

in which keryl denotes the mixture of alkyl radicals corresponding to the hydrocarbons of kerosene, and recovering from the resulting reaction mixture a quaternary ammonium compound of the formula

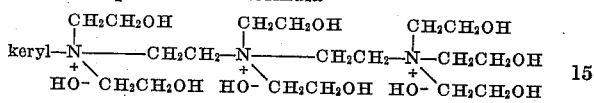

in which keryl denotes the mixture of alkyl radicals corresponding to the hydrocarbons of kerosene.

References Cited in the file of this patent
UNITED STATES PATENTS

| 2,214,352 | Schoeller et al. | Sept. 10, 1940 |

FOREIGN PATENTS

| 667,744 | Germany | Nov. 30, 1930 |